(12) United States Patent
Fogle

(10) Patent No.: US 6,944,956 B1
(45) Date of Patent: Sep. 20, 2005

(54) FIXED-LINE TRIMMER HEAD

(75) Inventor: John R. Fogle, Carefree, AZ (US)

(73) Assignee: Robert Phillips, Scottsdale, AZ (US), part interest ( * ) Notice: Subject to any disclaimer, the term of this patent is extended or adjusted under 35 U.S.C. 154(b) by 0 days.

(21) Appl. No.: 10/456,302

(22) Filed: Jun. 5, 2003

(51) Int. Cl.⁷ .......................................... A01D 34/84
(52) U.S. Cl. ........................... 30/347; 30/276; 56/12.7
(58) Field of Search ................. 30/276, 347; 56/12.7

(56) References Cited

U.S. PATENT DOCUMENTS

| | | | |
|---|---|---|---|
| 3,708,967 A * | 1/1973 | Geist et al. ................... | 56/12.7 |
| 4,035,912 A * | 7/1977 | Ballas et al. .................. | 30/276 |
| 4,062,114 A | 12/1977 | Luick ........................... | 30/276 |
| 4,118,865 A | 10/1978 | Jacyno ........................ | 30/276 |
| 5,758,424 A | 6/1998 | Iacona .......................... | 30/347 |
| 5,887,348 A | 3/1999 | Iacona et al. ................. | 30/277 |
| 5,896,666 A * | 4/1999 | Iacona et al. ................. | 30/276 |
| 6,035,618 A | 3/2000 | Fogle | |
| 6,314,848 B2 | 11/2001 | Morabit ....................... | 30/276 |
| 6,347,455 B2 | 2/2002 | Brandt ........................ | 30/276 |
| 6,401,344 B1 | 6/2002 | Moore ......................... | 30/347 |
| 6,519,857 B1 * | 2/2003 | Proulx et al. ................. | 30/276 |
| 2003/0033718 A1 * | 2/2003 | Alliss .......................... | 30/276 |

* cited by examiner

*Primary Examiner*—Hwei-Siu Payer
(74) *Attorney, Agent, or Firm*—LaValle D. Ptak

(57) ABSTRACT

A trimmer head for string trimmer machines uses a fixed line segment inserted into a passageway in the trimmer head housing where the line is engaged by a trimmer line retaining tab secured in the main housing and extending into the passageway for engagement by a trimmer line segment inserted into an entry opening.

16 Claims, 3 Drawing Sheets

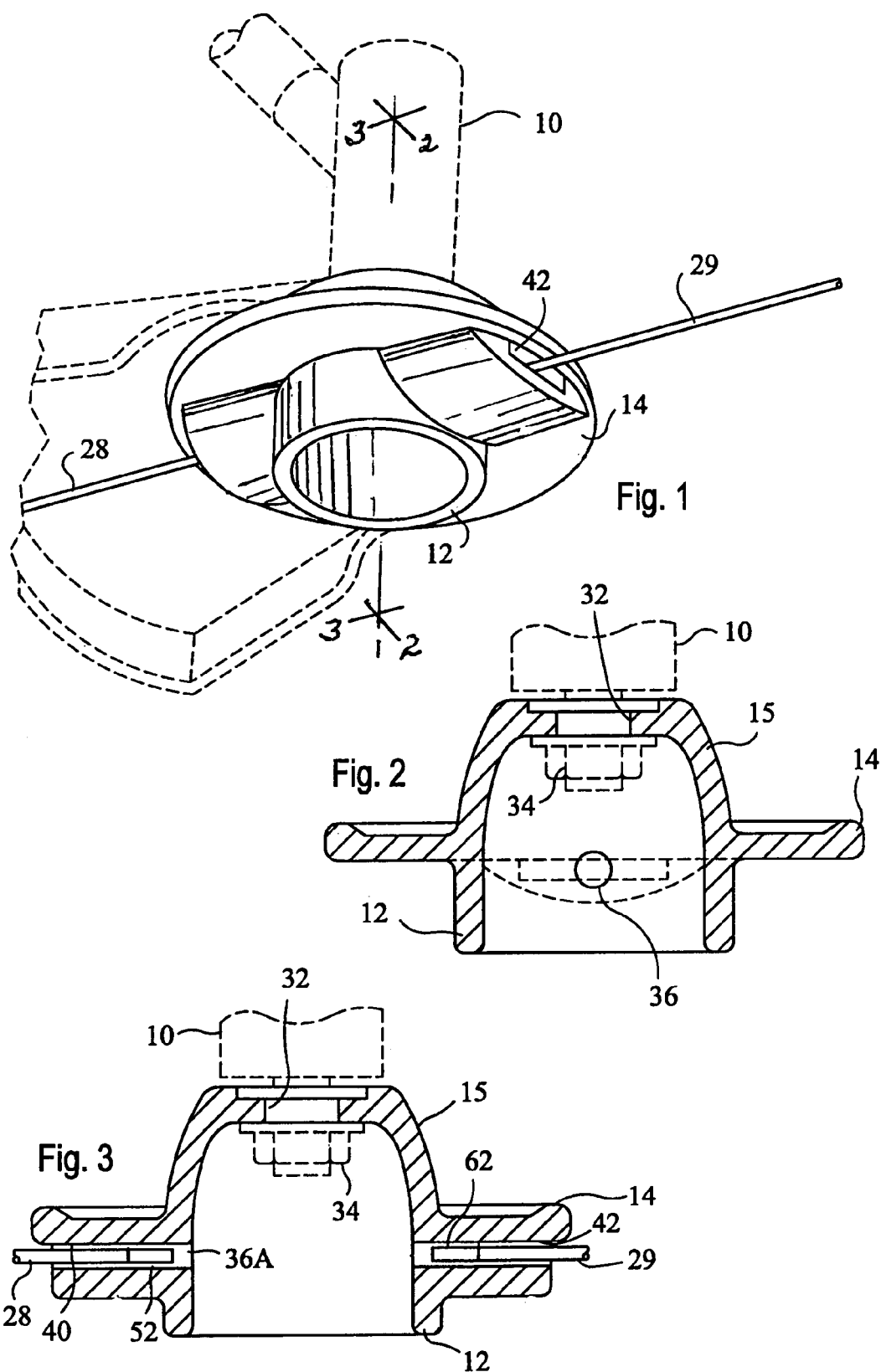

FIXED-LINE TRIMMER HEAD

BACKGROUND

Weed and grass trimmers have been developed which employ a rotatable hub with a short length of flexible nylon or other plastic line extending from the hub. When the hub is rotated (typically at speeds from 6,000 RPM to 12,000 RPM), the tip of the line extending from the hub provides the cutting or trimming action. Grass and weed trimmers using this principle of operation have become popular for their versatility of use and because the flexible trim line is safer to use than rigid rotating steel blades.

Various types of devices have been developed for using such trim lines. Typically, rotating line trimmers or rotating string trimmers employ a line which generally has a circular cross section. The line, in many trimmers, is wound on a storage reel in the hub of the device and is fed out of a hole in the hub in discrete amounts, as the end breaks off or wears off. Trimmers of this type sometimes are referred to as "bump and feed" trimmers, since, when the line breaks off, the bottom of the storage reel is bumped on the ground to cause a spring release of the line within the trimmer, which then plays out a short length of line through a hole in the hub by means of centrifugal force when the trimmer is operating. Typically, the smaller (with 2½" diameter to 3½" diameter head) bump and feed string trimmers use relatively small diameter line, normally in the range of 0.065" to 0.080" diameter, since the smaller diameter flexible line functions better for the centrifugal feeding of such a smaller diameter bump and feed head.

The reason that small diameter line is used in "bump and feed" string trimmers is that heavier diameter line (for example, 0.115" to 0.160" diameter) typically is too stiff for winding and for the centrifugal feeding used in "bump and feed" heads. Commercial bump and feed heads use a larger diameter head than was designed for home use, and operate with somewhat larger diameter flexible line, generally from 0.95" to 0.105" diameter and normally have a larger capacity for such line. Thus, less frequent reloading of the line is required.

A problem exists with bump and feed trimmers, however, in that frequently the line which is wound on the storage reel in the hub tends to become stuck, either due to partial fusion of the line within the hub, caused by high frequency vibration, or by successive turns of the line wound on the hub becoming somewhat entangled. As a result, feeding of the line from the hub, when desired, does not always take place. When this occurs, it is necessary to remove the hub from the string trimmer device and manually extract the desired length of line prior to reattaching the hub to the device. This is a very time consuming and frustrating experience for many users of flexible line string trimmers.

For commercial use employing relatively large diameter lines, for example 0.115" to 0.160" diameter, fixed-line trimmer heads usually are employed. The large diameter monofilament nylon lines are particularly useful where weed and grass growth is dense. The large diameter lines also provide longer length of service before the line needs to be replaced. Due to the hole design and pattern, smaller standard sized lines (under about 0.095" diameter) have a tendency to slip out of commercial fixed heads during operation.

One type of fixed line trimmer head for commercial use is the Echo® heavy duty fixed line trimmer head, stock No. 999442-0020. This trimmer head is designed to replace a saw blade trimmer/brush cutter or other types of flexible line trimmer heads. The Echo® trimmer head is open on its underside and provides serpentine paths for the insertion of two fixed lengths of 0.130" diameter monofilament nylon line. The line is inserted between closely spaced, offset guide surfaces to hold it in place during operation. When a new length of line needs to be inserted, the old line must be removed, and the new line guided in place around the guide surfaces. Because the guide surfaces are close together and 0.130" diameter line is relatively stiff, it is difficult to install and remove sections of nylon line from the Echo® trimmer head. This difficulty results in excessive time being consumed for the removal and replacement of line segments.

Other approaches to providing trimmer heads using fixed lengths of line are disclosed in the United States patent to Luick U.S. Pat. No. 4,062,114; Jacyno U.S. Pat. No. 4,118,865; and Morabit U.S. Pat. No. 6,314,848. All three of these patents disclose trimmer heads using lengths of line which have an enlarged portion, or an eyelet attached to one end for extension from the inside of the head out through an opening to be held in place by centrifugal force when the head is rotating. When the line is worn or breaks off, it may be removed from the inside by pulling back out in the opposite direction to allow replacement with a new line.

A problem which exists with this type of trimmer head and line combination, however, is that each length of line which is to be used with the head requires a special configuration on the inside end to prevent it from being pulled outwardly through the hole in the head from which the line extends. As a consequence, the cost of the line segments is substantially more than the cost for a line segment made of a piece of line which does not require the additional end configuration, or additional parts to be added to it.

A different approach for utilizing fixed line trimmer heads is disclosed in the United States patent to Moore U.S. Pat. No. 6,401,344. This patent employs a spring-biased clamp supported on the body of the head to engage a line filament, which passes straight through the head to extend outwardly on opposite sides of the head. An actuator button is projected through an opening in the body; and when this button is pressed, the clamp is released so that worn trimmer line may be removed and replaced with a new segment of line. The structure of the internal parts of the head is relatively complex because of the nature of the clamp and the various parts which are used to bias it into engagement with the line, and to allow the release by means of the external button.

Another approach to the utilization of fixed lengths of line for a string trimmer head is shown in the patent to Brandt U.S. Pat. No. 6,347,455. The structure of this patent employs a pair of opposing clamping jaws in the form of spring loaded cams, which are selectively opened by activation of a slide member on the top of the head to allow the insertion of a fixed length of trimmer line, or to allow the removal of a length of trimmer line from an opening on the periphery on the head. The spring loaded cams and the additional slide members again result in a relatively large number of parts causing the manufacture of the head to be somewhat complex and expensive.

Two other U.S. patents which disclose cam operated clamps for holding and releasing line in a string trimmer head are the United States patents to Iacona U.S. Pat. Nos. 5,758,424 and 5,887,348. Both of these patents disclose a trimmer head with a number of access openings about its periphery. Each of the openings is oriented adjacent a cam clamping member which is spring biased to engage trimmer string inserted through the opening. Removal of worn lengths of trimmer line is effected by withdrawing the trimmer line from the inside of the head, moving it in the same direction as it was inserted into the head. Once again, the number of parts which are required to effect the operation disclosed in these patents is relatively high. The cam requires a pivot and an additional spring to bias it into engagement with the line. Assembly of these parts at each of the line openings in the head results in substantial additional manufacturing steps, and additional parts and complexity in the head, thereby causing its cost and potential for failure to increase.

Accordingly, it is an object of this invention to provide an improved fixed line trimmer head for string trimmer machines which overcomes the disadvantages of the prior art, which may be used as an alternative to bump and feed cartridges, which is simple to manufacture, and which facilitates simple and quick loading and replacement of fixed lengths of trimmer line.

SUMMARY OF THE INVENTION

It is an object of this invention to provide an improved fixed line trimmer head.

It is another object of this invention to provide an improved fixed line trimmer head for string trimmer machines.

It is an additional object of this invention to provide an improved fixed line trimmer head for string trimmer machines in which lines of various diameters are readily installed and replaced.

It is yet another object of this invention to provide an improved fixed line trimmer head for string trimmer machines employing spring retaining tabs.

It is a further object of this invention to provide a fixed line trimmer head for string trimmer machines which is easy to load with trimmer line of various diameters, and which employs spring retaining tabs at each of the line entry/exit locations for facilitating easy insertion of a length of line into the head, and which firmly hold the line in place during use while permitting simple and rapid removal of line which is to be replaced.

In accordance with a preferred embodiment of the invention, a fixed line head for a string trimmer machine includes a main housing member. The housing member has a central axis with a first end for attachment to the drive shaft of a string trimmer machine. At least one string entry opening extends through the main housing member; and a line retaining spring tab is secured in the main housing member adjacent the string entry opening for engagement by a string trimmer line inserted into the entry hole in a first direction. The orientation of the spring tab is such to inhibit movement of the string trimmer line in a direction opposite to the direction of insertion.

BRIEF DESCRIPTION OF THE DRAWINGS

FIG. 1 is a bottom perspective view of a trimmer head employing a preferred embodiment of the invention;

FIG. 2 is a cross-sectional view taken along the line 2—2 of FIG. 1;

FIG. 3 is a cross-sectional view taken along the line 3—3 of FIG. 1;

DETAILED DESCRIPTION

Figure 4:
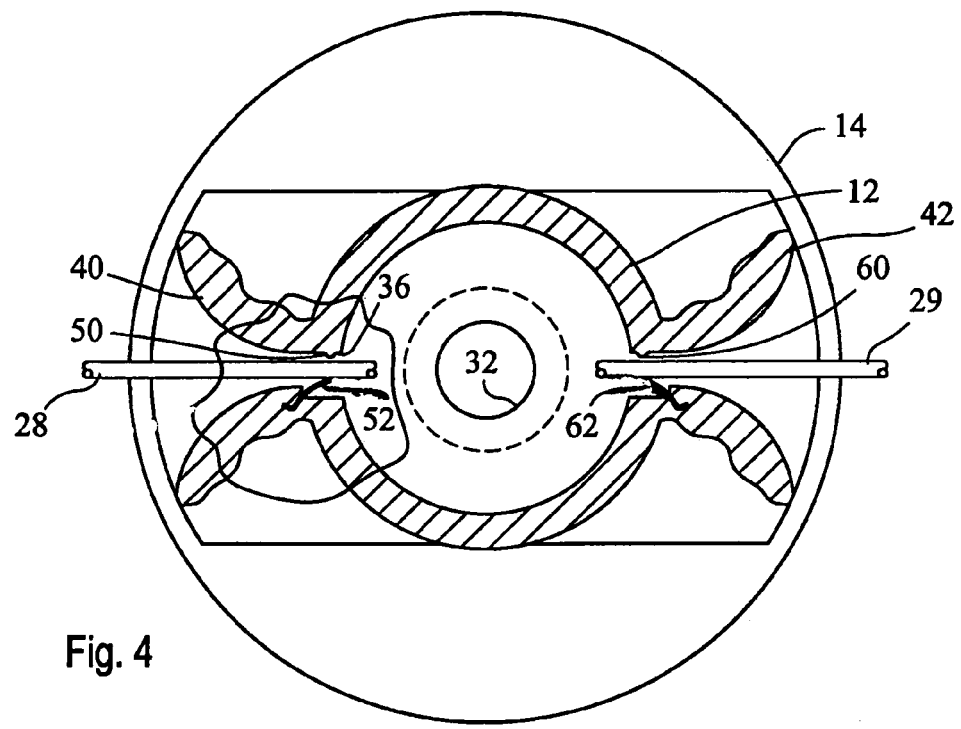
FIG. 4 is a bottom offset cross-sectional view of the embodiment shown in FIG. 1.

Reference now should be made to the drawings, in which the same reference numbers are used throughout the different figures to designate the same components. FIG. 1 is a bottom perspective view of a fixed line head for a string trimmer machine with which a preferred embodiment of the invention may be used.

The trimmer head is designed to be attached in place on the end of the operating shaft of a string trimmer machine 10. The head comprises a central cylindrically shaped main housing 12, with a circular flange 14 located intermediate its length. The lower end of the housing 12 is open, as is readily apparent from an examination of FIGS. 1, 2 and 3. The upper end of the housing comprises a portion 15 located above the flange 14. The end of the portion 15 is substantially closed, with a hole 32 formed through it. As shown in FIG. 2, the hole 32 is used to accommodate the drive shaft of the string trimmer machine 10, which then is secured to the housing 12/14/15 by means of a nut 34, or bolt (depending upon the design of the machine 10), as illustrated generally in FIGS. 1 and 2.

Typically, the fixed line trimmer head shown in the drawings is used to replace a "bump-and-feed" cartridge generally employed with string trimmer machines designed for home use. When the trimmer head shown in the drawings is attached in place, it is rotated at the speed of rotation of the drive shaft of the string trimmer machine 10. This speed of rotation for typical string trimmer machines ranges from a low of 6,000 RPM to a high of approximately 12,000 RPM. A typical operating speed is on the order of 8,000 RPM; although various factors cause this speed to vary with any given machine, depending upon the length of line used, the diameter of the line, and the number of lines extending from the rotating head.

For a commercial embodiment of the head shown in FIGS. 1 through 4, the outside diameter of the portion 12 of the main housing member is approximately 2-⅛"; and the wall thickness of the portion 12 is approximately ¼". The outside diameter of the flange 14 is 4"; and the overall height of the housing, from the top of the upper portion 15 to the open bottom of the portion 12, is approximately 2". These dimensions are typical of those of a head designed for use with a large number of different string trimmer machines manufactured by a variety of manufacturers for the home market. Clearly, the dimensions of the trimmer head may be varied in accordance with particular machines designed for different uses, as desired.

As shown most clearly in FIGS. 2,3 and 4, a fixed length of nylon trimmer line 28 or 29 is installed in the trimmer head by inserting one end of the trimmer line into a hole or passageway opening 40 or 42 (as shown most clearly in FIG. 4) from the outside of the head toward the central axis of the cylindrical portion 12, as illustrated most clearly in FIGS. 3 and 4. The holes or openings 40 and 42 are shaped as a pair of flared guides, as is most clearly illustrated in FIG. 4. The holes 40 and 42 are formed at the outer ends of passageways 36/36A, into which the line segments 28 and 29 are inserted.

The passageways 36/36A may have either a circular cross section; or they may be of other cross sections, such as oval, square or rectangular cross section to accommodate lines of various cross-sectional configurations. As illustrated in FIG. 4, one side of the passageway 36 associated with the hole 40 has a small protrusion 50 extending into it. Similarly, a protrusion 60 extends into the passageway associated with the hole or opening 42 on the opposite side of the head. It should be noted also that the head which is illustrated shows line segments 28 and 29 extending from two diametrically opposite sides of the head. More than two segments may be employed, if desired, for a particular application. In most cases, however, two segments such as those illustrated in the drawings of FIGS. 1,2,3 and 4 are employed for maximum efficiency, and for providing a balanced operation of the high speed rotating head.

Figures 5, 6, 7:
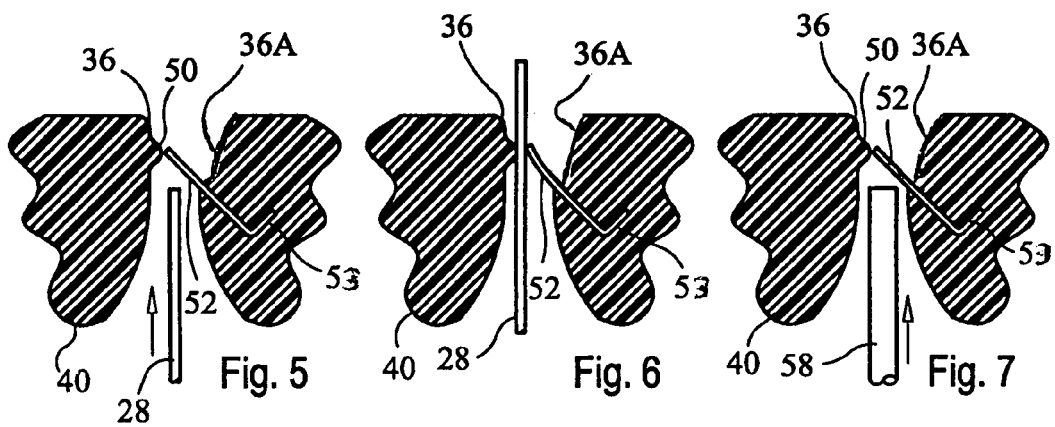
FIGS. 5 and 6 are cross-sectional views of a portion of the embodiment shown in FIG. 1 illustrating features of operation.
FIG. 7 is a cross section of the same portion shown in FIGS. 5 and 6 illustrating the embodiment with a larger diameter line.

FIGS. 3 and 4 also illustrate the location of line retaining spring tabs 52 and 62, which extend into the passageway 36/36A, for both of the line segments 28 and 29, to be engaged by a line segment inserted from the outside of the head toward the central axis, as illustrated in FIG. 4. FIGS. 5 and 6 show this in greater detail.

As shown in FIG. 5, when a line segment 28 is inserted through the passageway 40, the line retaining tab 52 extends substantially across the entire width of the passageway 36/36A to touch or engage the protrusion 50. As the line segment 28 is inserted fully into position, as shown in FIGS. 4 and 6, the retaining spring tab 52 bends downwardly as shown in FIG. 4, and toward the right as shown in FIG. 6, to press against the line segment 28, which is engaged on the other side by the protrusion 50.

Figure 10:
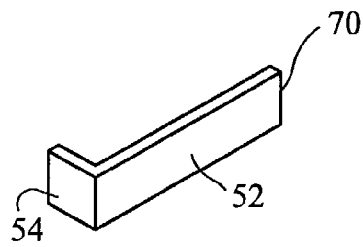
FIGS. 10 to 12 illustrate perspective views of alternative components of preferred embodiments of the invention.

The line retaining tab 52 is in the form of an L-shaped segment of spring steel having a rectangular cross section, as illustrated most clearly in FIG. 10. The short leg 53 of the L is embedded into the material comprising the housing adjacent the passageway formed by the portions 36/36A. The long portion or leg of the tab 52 extends into and across the passageway, as illustrated in FIG. 5. The line retaining tab 52 shown in FIGS. 5,6 and 7, and also in FIG. 10, has an end which is sharply cut at 90° to the major dimension of the long leg portion of the tab 52. This sharp edge then engages the edge of the line 28, as illustrated in FIG. 6.

So long as the line 28 is moved in the direction of the arrow in FIG. 5, it freely passes through the passageway and may be pulled all the way out of the passageway, if desired. This is the manner which is used to remove worn or broken segments of line. They are pulled from the center of the head, as shown in FIG. 4, or upwardly as shown in FIG. 6 to remove the segments from the head. A new line segment then is inserted, as shown in FIGS. 5 and 6.

When the head is used, however, centrifugal force and the force of the line striking weeds and grass which are being cut tends to pull the trimmer line 28 downwardly (as shown in FIG. 6). This causes the sharp edge 70 of the spring retaining tab 52 to tend to be moved downwardly into engagement with the projection 50 to prevent movement of the line in this direction. A very secure holding of the trimmer line is effected, with relatively little spring force being necessary in order to accomplish this purpose.

Typically, the line retaining tabs 52 and 62 are made of lightweight spring steel, which is an excellent material; although other materials may be used as well. It also should be noted that while the cross-sectional representation of the head portion shown in FIGS. 5 through 9 is that of plastic material, metal could be used as well, with the line retaining tab 52 (or 62) being secured by means of a suitable adhesive or by brazing in the metal head. The configuration shown in FIG. 4 for the tabs 52 and 62, and illustrated in detail in FIGS. 5 to 9, shows the manner in which the retaining tabs clearly hold the line in place.

Because of the configuration of the passageway formed by the portions 36 and 36A, lines of different diameters or different cross-sectional shapes may be inserted into the passageway and securely retained without any modification to the head. This is illustrated in FIG. 7, which shows a larger diameter line 58 in the process of being inserted into the opening 40 in place of the smaller diameter line 28, which has been described above in conjunction with FIGS. 4,5 and 6. The operation is the same; so that line of any diameter or other cross-sectional shape, from a small cross section to the largest one which can be accommodated through the passageway 36/36A, may be utilized without any modification to the head.

It also should be noted, as shown most clearly in FIGS. 5,6 and 7, that the portion 36A of the passageway 36/36A is cut away behind the line spring retaining tab 52 to facilitate the bending movement of the tab when trimmer line is inserted through the opening. The size of the passageway in front of the tab 52 or 62 (on the side of the holes or openings 40 and 42) is smaller, which aids in preventing the retaining tab 52 or 62 from being pulled or bent outwardly under the centrifugal forces applied to the line 28 or 58 in the direction opposite the arrows shown in FIGS. 5 and 7.

Figures 8, 9:
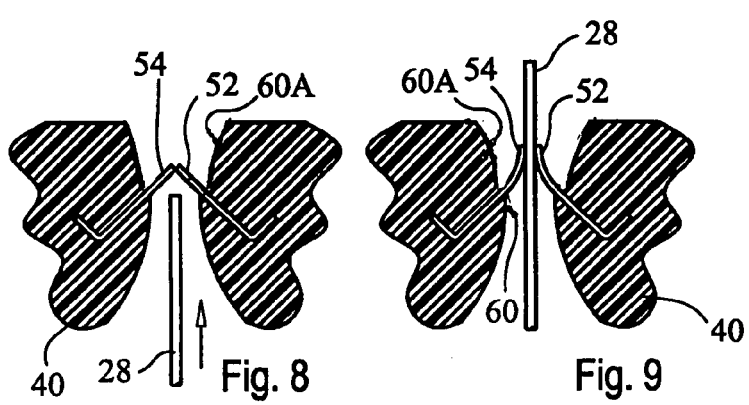
FIGS. 8 and 9 are cross-sectional views showing a feature of an alternative embodiment of the invention.

FIG. 8 shows an alternative to the embodiment described above in conjunction with FIGS. 4 through 7. In the embodiment of FIG. 8, two opposing line retaining tabs 52 and 54 are shown in place of the retaining tab 52 and projection 50 of FIG. 5. The line retaining tabs 52 and 54 extend into the passageway 60/60A from opposite sides and at the same angle; so that when a line 28 is inserted into the position shown in FIG. 9, it is centered between the tabs and is gripped on both sides by the sharp edges 70 of the tabs 52 and 54. In all other respects, the operation of the embodiment shown in FIGS. 8 and 9 is identical to the operation described above for FIGS. 4 through 7.

Figure 11:
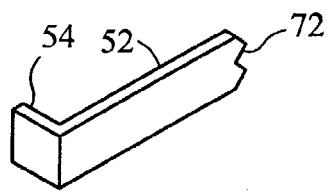
Figure 12:
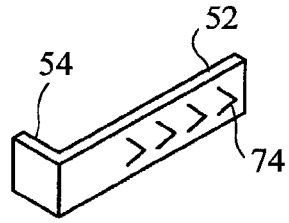

FIGS. 10,11 and 12 illustrate various alternatives to the configuration of the line retaining tabs. The configuration shown in FIG. 10 has been described in detail in conjunction with the embodiments of FIGS. 4 through 9. That configuration, however, readily may be replaced with the one shown in either FIG. 11 or 12. In the configuration of FIG. 11, the end 72 of the line retaining tab is serrated or toothed. In the configuration of FIG. 12, the edge which faces the entry side of the hole or opening 40 is provided with some formed or punched out triangular projections 74; so that for large diameter line especially, the projections 74 engage the side of the line in addition to, or in place of the engagement by the end of the tab. Again, the operation of the invention is the same, irrespective of the particular shape of the spring tab 52 (or 62) which is used.

Figure 13:
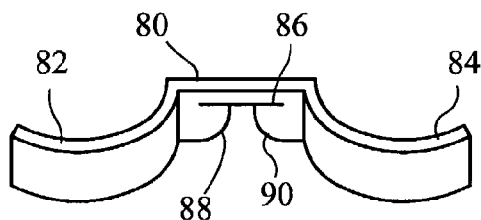
FIGS. 13 and 14 illustrate a component used in an alternative embodiment of the invention.
Figure 14:
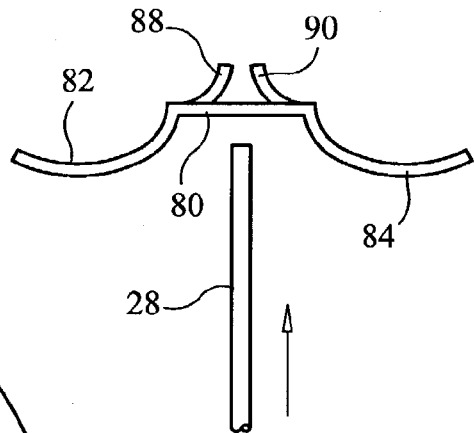

FIGS. 13 and 14 illustrate an alternative to the embodiments described above. In the embodiment shown in FIGS. 13 and 14, a single piece of spring steel is shaped with outer projections or wings 82 and 84. These are embedded on opposite sides of the passageway 36/36A formed in the head. The central portion 80, which bridges the anchoring parts 82 and 84, extends across the passageway opening or immediately above it, and is cut by a slit 86; so that spring tabs 88 and 90 which face one another, as shown most clearly in FIG. 14, stretch across the opening. The configuration of FIGS. 13 and 14 operates in a manner similar to the one described above in conjunction with FIGS. 8 and 9, and functions in the same manner to hold a segment of line, such as the segment 28 shown in FIG. 14, in place once the segment is inserted to a position comparable to that shown in FIG. 9.

It has been found that an ideal angle relative to the opening or hole 40 for the line retaining tabs 52/62/54/88 and 90 is between 45° and 60°, extending away from the opening toward the central axis of the head. At higher angles, the retaining tabs tend to be too tangential to the outer surface of the line segments 28,29 or 58 to bite into the line segments to hold them in place, and at greater angles, insertion becomes more difficult; and the line retaining capability is lessened.

It should be noted that the passageway 36/36A may be wider in the horizontal plane than in the vertical plane to accommodate and properly orient trimmer line which is oval or flattened in shape. In fact, the passageway 36/36A may have any suitable shape and orientation to accommodate lines of any desired cross-sectional configuration and orientation. Also, the spring tabs, such as the tabs 52 and 62 may be located in any suitable position in the passageways 36/36A, including the top, for example. In addition, if the string trimmer line has transverse slots, grooves or ridges in it, the holding power of the spring tabs is enhanced.

Figure 15:
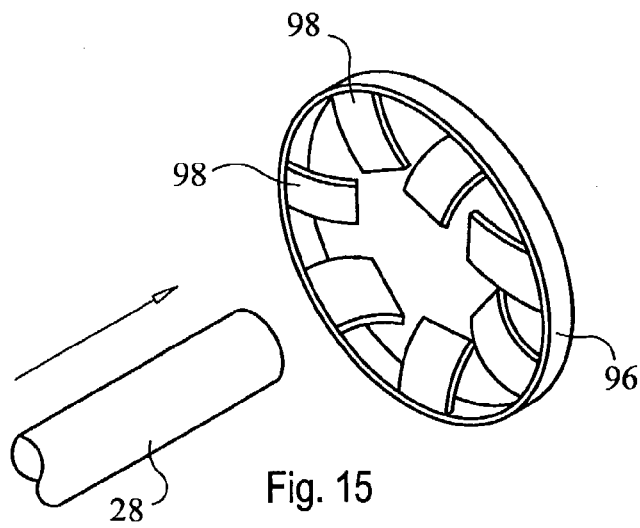
FIG. 15 is a perspective view of another alternative component of a preferred embodiment of the invention.

FIG. 15 illustrates an additional alternative to the various embodiments which have been described previously. In the embodiment shown in FIG. 15, a circular washer-like retaining element 96 is made of spring steel, and includes inwardly directed projections 98 which extend rearwardly toward the right, as viewed in FIG. 15. This is a gripping type of washer, which may be of standard configuration; and it may be placed in the center of the passageway 36/36A formed in the head to provide the spring extensions 98 in a circular arrangement extended toward the center of the passageway 36/36A. A small circular opening is left at the free ends of the tabs 98. This opening is designed to be slightly smaller than the diameter of the smallest line 28 which is to be inserted into the passageway to be engaged by the spring tab fingers 98. The manner in which these spring tab fingers 98 hold the line in place, after it is inserted in the direction shown by the arrow in FIG. 15, is the same as described previously for the other spring tab embodiments of the invention. The spring washer 96/98 may be permanently embedded in the passageway 36/36A; or the head may be formed in a two-part section to allow insertion of the edge of the washer 96 in mating slots in the upper and lower portions of the passageway 36/36A. Thus, the spring tab washer 96/98 may be removed and replaced if some of the spring tab members 98 should become worn or broken through use. Such a utilization of a two-part head also may be effective for allowing the original incorporation and subsequent removal and replacement of all of the different embodiments shown in FIGS. 10 through 14.

The foregoing description of the preferred embodiment of the invention is to be considered as illustrative and not as limiting. Various modifications will occur to those skilled in the art for performing substantially the same function, in substantially the same way, to achieve substantially the same result without departing from the true scope of the invention as defined in the appended claims.

What is claimed is:

1. A fixed line head for a string trimmer machine including in combination:
   a main housing member having a central axis with a first end for attachment to a drive shaft of a string trimmer machine;
   at least one string entry opening in the main housing member; and
   a line retaining spring tab extending into the string entry opening and substantially across the width of the string entry opening for engagement by a string trimmer line inserted into the string entry opening in a first direction so that the line retaining spring tab is bent away to press against the string trimmer line, and oriented to prevent withdrawal of a string trimmer line outwardly from the string entry opening in a direction opposite the first direction.

2. The head according to claim 1 wherein the line retaining spring tab is a unitary tab made of spring steel.

3. The head according to claim 2 wherein the line retaining spring tab has a rectangular cross section.

4. A head according to claim 2 wherein the line retaining tab has a generally rectangular cross section, with a first end secured in the main housing member and a second end arranged for engagement by a string trimmer line, wherein the second end has at least one sharp edge thereon for engaging a string trimmer line.

5. The head according to claim 4 wherein the string entry opening is a passageway through the main housing member, and the line retaining spring tab extends into the passageway from one side to the opposite side a distance greater than the diameter of a string trimmer line to be inserted into the string entry opening.

6. The head according to claim 5 wherein the passageway adjacent the line retaining spring tab is narrower on the side facing the string entry opening and wider on the opposite side of the line retaining spring tab.

7. A head according to claim 6 wherein the passageway has a central axis and the line retaining spring tab extends into the passageway at an angle between 45° and 60° away from the string entry opening.

8. A head according to claim 1 wherein first and second line retaining spring tabs are secured in the main housing member on opposite sides of the string entry opening for engagement by a string trimmer line inserted into the string entry opening.

9. A head according to claim 8 wherein the first and second line retaining spring tabs each are formed from spring steel.

10. A head according to claim 4 wherein the line retaining spring tab has a plurality of projections along the length thereof for engaging a string trimmer line.

11. The head according to claim 1 wherein the string entry opening is a passageway through the main housing member, and the line retaining spring tab extends into the passageway from one side to the opposite side a distance greater than the diameter of a string trimmer line to be inserted into the string entry opening.

12. The head according to claim 11 wherein the passageway adjacent the line retaining spring tab is narrower on the side facing the string entry opening and wider on the opposite side of the line retaining spring tab.

13. A head according to claim 12 wherein the passageway has a central axis and the line retaining spring tab extends into the passageway at an angle between 45° and 60° away from the string entry opening.

14. The head according to claim 1 wherein the line retaining spring tab has a rectangular cross section.

15. A head according to claim 1 wherein the line retaining tab has a generally rectangular cross section, with a first end secured in the main housing member and a second end arranged for engagement by a string trimmer line, wherein the second end has at least one sharp edge thereon for engaging a string trimmer line.

16. A head according to claim 1 wherein the line retaining spring tab has a plurality of projections along the length thereof for engaging a string trimmer line.

* * * * *